A. M. HANNA.
Earth-Auger.

No. 162,816.

Patented May 4, 1875.

WITNESSES:

INVENTOR:
Andrew M. Hanna
BY
ATTORNEYS.

UNITED STATES PATENT OFFICE.

ANDREW M. HANNA, OF KOSCIUSKO, MISSISSIPPI.

IMPROVEMENT IN EARTH-AUGERS.

Specification forming part of Letters Patent No. 162,816, dated May 4, 1875; application filed March 29, 1875.

*To all whom it may concern:*

Figure 1:
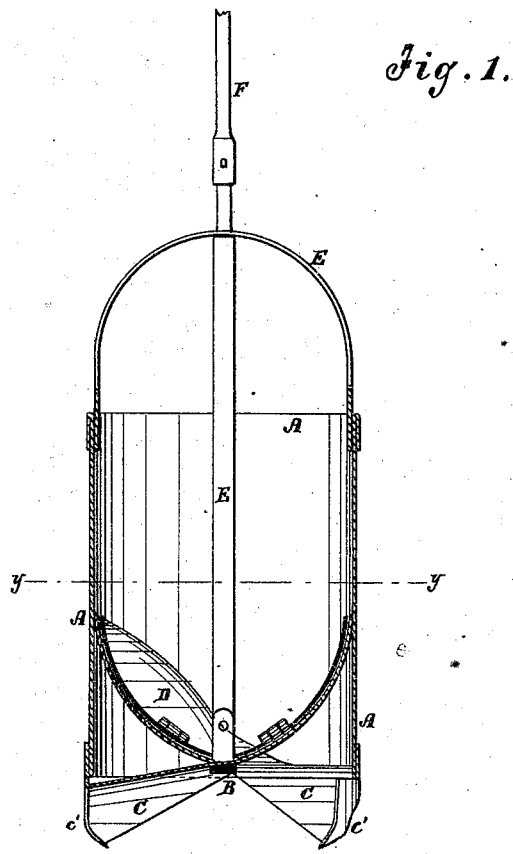
Figure 2:
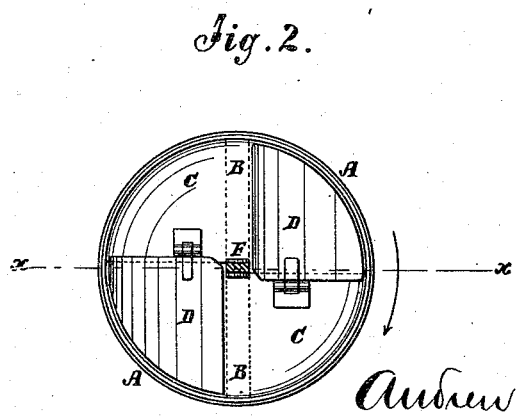

Be it known that I, ANDREW M. HANNA, of Kosciusko, in the county of Attala and State of Mississippi, have invented a new and useful Improvement in Earth-Auger, of which the following is a specification:

Figure 1 is a longitudinal section of my improved earth-auger, taken through the line $x\,x$, Fig. 2. Fig. 2 is a cross-section of the same, taken through the line $y\,y$, Fig. 1.

Similar letters of reference indicate corresponding parts.

The object of this invention is to furnish an improved earth-auger for boring wells, and which shall be so made as to enable the earth to be readily removed by and with the auger.

The invention consists in an improved earth-auger, formed by the combination of the cylinder, the cross-bar, the cutters, having flaps or valves hinged to their inner edges, and lips upon the outer corners of their cutting-edges, the bail, and the sectional shaft, with each other, as hereinafter fully described.

A is a cylinder, three feet, more or less, in diameter, and of such a length that it may be conveniently handled. The cylinder A is made of heavy sheet metal, of such a thickness as will give the necessary strength, and to its lower end is attached a cross-bar, B. To the cross-bar B are bolted the blades or cutters C, which are curved into spiral form, and each of which makes about half a turn. The cutters C are bolted to the cross-bar B, so that they can be readily detached to be sharpened or repaired. To the rear edge of each cutter C is hinged a leaf, flap, or valve, D, which shuts down against the other cutter, so that the earth contained in the cylinder may be raised by and with it. The forward or cutting-edges of the cutter C project a little below the lower end of the cylinder A, and have lips $c'$ formed upon their outer corners, which project a little beyond the cylinder A, so as to bore a hole a little larger than the cylinder, so that the said cylinder can be easily raised and lowered through said hole. To the upper end of the cylinder A is rigidly attached a bail, E. F is the shaft, which is attached to the bail E and to the cross-bar V. The shaft F is made in sections, the lower end of each upper section having a square socket formed in it to receive and fit upon the squared upper end of each lower section. The interlocked ends of the shaft-sections are secured together by a bolt, pin, or key, so that the cylinder A can be raised and lowered by the shaft F. To the lower end of the lower section of the shaft F should be attached an auger about two inches in diameter and about six inches long, to cause the auger to pass vertically through the ground.

Having thus described my invention, I claim as new and desire to secure by Letters Patent—

An improved earth-auger, formed by the combination of the cylinder A, the cross-bar B, the cutters C, having flaps or valves D hinged to their inner edges, and lips $c'$ upon the outer corners of their cutting-edges, the bail E, and the sectional shaft F, with each other, substantially as herein shown and described.

ANDREW M. HANNA.

Witnesses:
SAML. PHILLIPS,
W. B. TURNAGE.